US012223894B2

(12) United States Patent
Zhu et al.

(10) Patent No.: US 12,223,894 B2
(45) Date of Patent: Feb. 11, 2025

(54) PIXEL DRIVING CIRCUIT, DRIVING METHOD THEREOF AND DISPLAY PANEL

(71) Applicants: MIANYANG BOE OPTOELECTRONICS TECHNOLOGY CO., LTD., Sichuan (CN); BOE TECHNOLOGY GROUP CO., LTD., Beijing (CN)

(72) Inventors: Yawei Zhu, Beijing (CN); Xin Cao, Beijing (CN); Zifeng Wang, Beijing (CN); Danfeng Wang, Beijing (CN); Haoyuan Fan, Beijing (CN)

(73) Assignees: MIANYANG BOE OPTOELECTRONICS TECHNOLOGY CO., LTD., Sichaun (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/913,428

(22) PCT Filed: Oct. 29, 2021

(86) PCT No.: PCT/CN2021/127416
§ 371 (c)(1),
(2) Date: Sep. 21, 2022

(87) PCT Pub. No.: WO2022/199024
PCT Pub. Date: Sep. 29, 2022

(65) Prior Publication Data

US 2024/0212603 A1 Jun. 27, 2024

(30) Foreign Application Priority Data

Mar. 24, 2021 (CN) ......................... 202110314161.8

(51) Int. Cl.
*G09G 3/3233* (2016.01)

(52) U.S. Cl.
CPC ... *G09G 3/3233* (2013.01); *G09G 2300/0426* (2013.01); *G09G 2300/0465* (2013.01);
(Continued)

(58) Field of Classification Search
CPC ......... G09G 3/3233; G09G 2300/0426; G09G 2300/0465; G09G 2300/0819;
(Continued)

(56) References Cited

U.S. PATENT DOCUMENTS

2015/0171154 A1 6/2015 Kang
2016/0322446 A1 11/2016 Park et al.
(Continued)

FOREIGN PATENT DOCUMENTS

CN 107358918 A 11/2017
CN 107452331 A 12/2017
(Continued)

OTHER PUBLICATIONS

Translation of KR20180056442A (Year: 2018).*
(Continued)

*Primary Examiner* — Lixi C Simpson
(74) *Attorney, Agent, or Firm* — Nath, Goldberg & Meyer; Joshua B. Goldberg

(57) ABSTRACT

A pixel driving circuit, a driving method thereof and a display panel are provided. The pixel driving circuit includes a driving transistor, a capacitor having two terminals connected to a first power terminal and a gate electrode of the driving transistor, and a light emitting device. The pixel driving circuit includes: a reset module; a data writing module; a threshold compensation module including a compensation transistor configured to electrically connect second and gate electrodes of the driving transistor together in the data writing phase; a light emitting control module including a first gating transistor configured to electrically
(Continued)

connect the second electrode of the driving transistor and the light emitting device in the reset phase and disconnect the second electrode from the light emitting device in the data writing phase. The compensation transistor and the first gating transistor are oxide transistors, and the driving transistor is a low-temperature polysilicon transistor.

20 Claims, 4 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2320/0233* (2013.01)

(58) Field of Classification Search
CPC ... G09G 2300/0842; G09G 2300/0861; G09G 2310/08; G09G 2320/0233
See application file for complete search history.

(56) References Cited

U.S. PATENT DOCUMENTS

| | | | |
|---|---|---|---|
| 2019/0096331 A1 | 3/2019 | Kwon et al. | |
| 2019/0131376 A1* | 5/2019 | Hong | H10K 59/131 |
| 2019/0340977 A1 | 11/2019 | Park et al. | |

FOREIGN PATENT DOCUMENTS

| | | | | |
|---|---|---|---|---|
| CN | 107680537 A | | 2/2018 | |
| CN | 108492781 A | | 9/2018 | |
| CN | 108538248 A | | 9/2018 | |
| CN | 108877680 A | | 11/2018 | |
| CN | 109599062 A | | 4/2019 | |
| CN | 109727574 A | | 5/2019 | |
| CN | 110223636 A | | 9/2019 | |
| CN | 110570818 A | | 12/2019 | |
| CN | 110660360 A | | 1/2020 | |
| CN | 111462694 A | | 7/2020 | |
| CN | 111724744 A | * | 9/2020 | G09G 3/3233 |
| CN | 111754920 A | | 10/2020 | |
| CN | 112102785 A | | 12/2020 | |
| CN | 113066434 A | | 7/2021 | |
| KR | 101676223 B1 | | 11/2016 | |
| KR | 20180056442 A | * | 5/2018 | |

OTHER PUBLICATIONS

Translation of CN-111724744-A (Year: 2020).*
First Office Action issued on Jun. 6, 2022 for application No. CN 202110314161.8 with English translation attached.
Rejection of the Office Action issued on Nov. 16, 2022 for application No. CN 202110314161.8 with English translation attached.

* cited by examiner

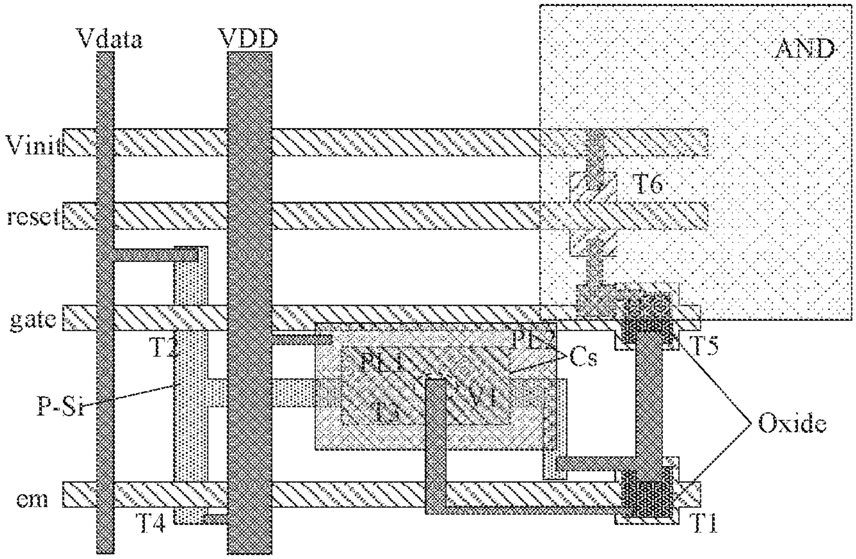

FIG. 7

S1: in the reset phase, the first gating transistor and the compensation transistor are turned on, and the reset module transmits a signal at the initialization voltage terminal to the gate electrode of the driving transistor and the light emitting device through the first gating transistor and the compensation transistor to control the driving transistor to be turned on; the light emitting control module disconnects the first power terminal from the first electrode of the driving transistor S2: in the data writing phase, the data writing module writes a data signal at the data writing terminal into the first electrode of the driving transistor; the compensation transistor electrically connects the second electrode and the gate electrode of the driving transistor together; the light emitting control module disconnects the first power terminal from the first electrode of the driving transistor and disconnects the second electrode of the driving transistor from the light emitting device S3: in the light emitting phase, the light emitting control module electrically connects the first power terminal and the first electrode of the driving transistor together and electrically connects the second electrode of the driving transistor and the light emitting device together

FIG. 8

PIXEL DRIVING CIRCUIT, DRIVING METHOD THEREOF AND DISPLAY PANEL

This is a National Phase Application filed under 35 U.S.C. 371 as a national stage of PCT/CN2021/127416, filed Oct. 29, 2021, an application claiming the benefit of Chinese Application No. 202110314161.8, filed Mar. 24, 2021, the content of each of which is hereby incorporated by reference in its entirety.

TECHNICAL FIELD

The present disclosure relates to the field of display technology, and in particular to a pixel driving circuit, a driving method thereof, and a display panel.

BACKGROUND

An LTPS-TFT (low temperature polysilicon thin film transistor) has a high electron mobility, and an oxide TFT (oxide thin film transistor) also has the advantages of a high electron mobility, a good uniformity of a large area, a low temperature for a manufacturing process and the like, so that a display panel including an LTPO (including a low temperature polysilicon oxide TFT) combining with the LTPS-TFT and the oxide TFT may realize more excellent response characteristics, lower power consumption and perfect pictures for a black screen, and has a good application prospect.

SUMMARY

The present disclosure provides a pixel driving circuit, a driving method thereof and a display panel.

In one embodiment, the pixel driving circuit includes a driving transistor, a capacitor and a light emitting device, wherein both terminals of the capacitor are connected to a first power terminal and a gate electrode of the driving transistor, respectively, wherein the pixel driving circuit further includes: a reset module configured to transmit a signal at an initialization voltage terminal to the gate electrode of the driving transistor and a first terminal of the light emitting device in a reset phase, so as to initialize potentials at the gate electrode of the driving transistor and the first terminal of the light emitting device, a data writing module configured to write a data signal at a data writing terminal into a first electrode of the driving transistor in a data writing phase; a threshold compensation module including a compensation transistor, which is configured to electrically connect a second electrode and the gate electrode of the driving transistor together in the data writing phase; and a light emitting control module including a first gating transistor and configured to disconnect the first power terminal from the first electrode of the driving transistor in the reset phase and the data writing phase; wherein the first gating transistor is configured to electrically connect the second electrode of the driving transistor and the light emitting device in the reset phase and disconnect the second electrode of the driving transistor from the light emitting device in the data writing phase; the light emitting control module is configured to electrically connect the first power terminal and the first electrode of the driving transistor and electrically connect the second electrode of the driving transistor and the light emitting device in a light emitting phase; and wherein the compensation transistor is an oxide transistor, the driving transistor is a low-temperature polysilicon transistor, and the first gating transistor is an oxide transistor.

In one embodiment, the light emitting control module further includes a second gating transistor configured to disconnect the first power terminal from the first electrode of the driving transistor in the reset phase and the data writing phase, and electrically connect the first power terminal to the first electrode of the driving transistor in the light emitting phase.

In one embodiment, a gate electrode of the second gating transistor is connected to a light emitting control terminal, a gate electrode of the first gating transistor is connected to a scan signal terminal, a first electrode of the second gating transistor is connected to the first power terminal, and a second electrode of the second gating transistor is connected to the first electrode of the driving transistor; and a first electrode of the first gating transistor is connected to the second electrode of the driving transistor, and a second electrode of the first gating transistor is connected to the first terminal of the light emitting device.

In one embodiment, a gate electrode of the compensation transistor is connected to the light emitting control terminal, a first electrode of the compensation transistor is connected to the second electrode of the driving transistor, and a second electrode of the compensation transistor is connected to the gate electrode of the driving transistor.

In one embodiment, the data writing module includes a writing transistor, and a gate electrode of the writing transistor is connected to the scan signal terminal, a first electrode of the writing transistor is connected to the data writing terminal, and a second electrode of the writing transistor is connected to the first electrode of the driving transistor.

In one embodiment, the reset module includes a reset transistor; a gate electrode of the reset transistor is connected to a reset terminal, a first electrode of the reset transistor is connected to the first terminal of the light emitting device, and a second electrode of the reset transistor is connected to the initialization voltage terminal.

In one embodiment, the second gating transistor, the writing transistor and the reset transistor are all low-temperature polysilicon transistors.

In one embodiment, the compensation transistor and the first gating transistor are N-type transistors; and the driving transistor, the second gating transistor, the writing transistor and the reset transistor are all P-type transistors.

In one embodiment, the pixel driving circuit further includes a substrate, wherein the first gating transistor, the second gating transistor, the writing transistor, the reset transistor, the compensation transistor, the driving transistor, and the capacitor are on the substrate.

In one embodiment, the pixel driving circuit further includes a first insulating layer, a second insulating layer, a third insulating layer, an interlayer dielectric layer, a planarization layer, and a pixel defining layer sequentially on the substrate, wherein an active layer of the driving transistor is between the substrate and the first insulating layer; the gate electrode of the driving transistor is on the active layer of the driving transistor and between the first insulating layer and the second insulating layer; a source electrode and a drain electrode of the driving transistor are in a same layer and between the interlayer dielectric layer and the planarization layer; and the gate electrode of the compensation transistor, the gate electrode of the first gating transistor and the gate electrode of the driving transistor are in a same layer and between the first insulating layer and the second insulating layer; an active layer of the compensation transistor and an active layer of the first gating transistor are in a same layer and between the second insulating layer and the third insulating layer; and a source electrode and a drain electrode of the compensation transistor, a source electrode and a drain electrode of the first gating transistor and the source electrode and the drain electrode of the driving transistor are in a same layer and between the interlayer dielectric layer and the planarization layer.

In one embodiment, active layers of the second gating transistor, the writing transistor, the reset transistor and the driving transistor are in a same layer and between the substrate and the first insulating layer; the gate electrodes of the second gating transistor, the writing transistor and the reset transistor and the gate electrode of the driving transistor are in a same layer and between the first insulating layer and the second insulating layer; and source and drain electrodes of the second gating transistor, the writing transistor and the reset transistor and the source and drain electrodes of the driving transistor are in a same layer and between the interlayer dielectric layer and the planarization layer.

In one embodiment, the gate electrode of the writing transistor and the gate electrode of the first gating transistor are on a same first scan signal line; and/or the gate electrode of the second gating transistor and the gate electrode of the compensation transistor are on a same light emitting signal line.

In one embodiment, the gate electrode of the reset transistor is on a reset signal line; and/or a first plate of the capacitor is in a same layer as the gate electrode of the driving transistor, and a second plate of the capacitor is connected to the first power terminal and in a same layer as a second scan signal line of the pixel driving circuit, which is different from the first scan signal line, wherein the second plate is directly above the first plate.

In one embodiment, the source electrode of the compensation transistor is connected to the first plate through a via extending through the second plate.

In one embodiment, the active layers of the driving transistor, the writing transistor, the second gating transistor and the reset transistor are made of low-temperature polysilicon; and the active layer of the compensation transistor and the active layer of the first gating transistor are made of an oxide material.

In one embodiment, the oxide material includes IGZO.

The present disclosure also provides a driving method of the pixel driving circuit, including: in the reset phase, turning on the first gating transistor and the compensation transistor, and transmitting, by the reset module, the signal at the initialization voltage terminal to the gate electrode of the driving transistor and the light emitting device through the first gating transistor and the compensation transistor, to control the driving transistor to be turned on; disconnecting, by the light emitting control module, the first power terminal from the first electrode of the driving transistor; in the data writing phase, writing, by the data writing module, the data signal at the data writing terminal into the first electrode of the driving transistor; electrically connecting, by the compensation transistor, the second electrode and the gate electrode of the driving transistor together; disconnecting, by the light emitting control module, the first power terminal from the first electrode of the driving transistor and disconnecting the second electrode of the driving transistor from the light emitting device, and in the light emitting phase, electrically connecting, by the light emitting control module, the first power terminal and the first electrode of the driving transistor together and electrically connecting the second electrode of the driving transistor and the light emitting device together.

In one embodiment, the driving method further includes: in the reset phase, providing a first level signal to the reset terminal and providing a second level signal to the scan signal terminal and the light emitting control terminal; in the data writing phase, providing the second level signal to the reset terminal and the light emitting control terminal, and providing the first level signal to the scan signal terminal; and in the light emitting phase, providing the second level signal to the reset terminal and the scan signal terminal, and providing the first level signal to the light emitting control terminal.

The present disclosure further provides a display panel, including the above pixel driving circuit.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. In the drawings:

FIG. 7 illustrates a plan view of a layout of the pixel driving circuit according to the embodiment of the present disclosure shown in FIG. 2; and FIG. 8 shows a flow chart of a driving method of a pixel driving circuit according to an embodiment of the present disclosure.

DETAIL DESCRIPTION OF EMBODIMENTS

The embodiments of the present disclosure will be described in further detail with reference to the accompanying drawings. It should be understood that the embodiments of the present disclosure are only used to explain and describe the present disclosure, not to limit the present disclosure.

The LTPO in the related art has a complicated structure with a great number of vias, so that it is difficult to implement a product having a high pixel resolution (PPI). It is required to simultaneously use P type and N type oxide TFTs, design a new gate driving circuit (gate on array, GOA) and separately output a control signal, so that it is difficult to implement a product having a narrow frame.

Figure 1:
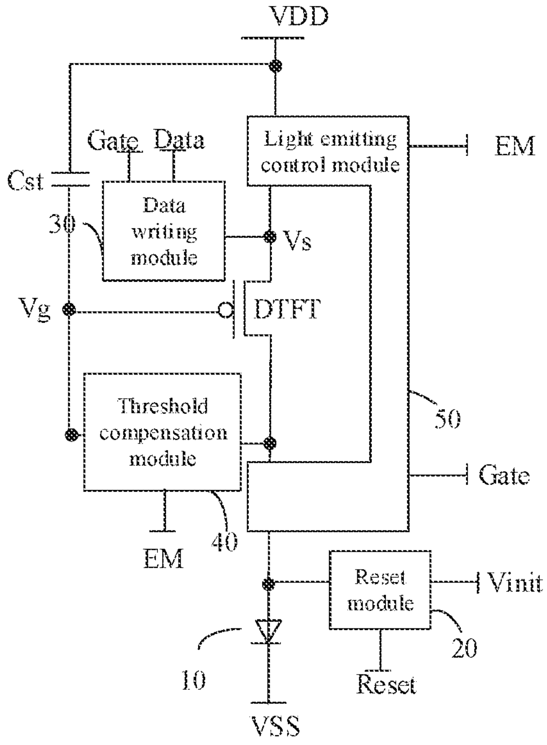
FIG. 1 shows a schematic diagram of a structure of a pixel driving circuit according to an embodiment of the present disclosure.

FIG. 1 is a schematic diagram of a pixel driving circuit according to an embodiment of the present disclosure. As shown in FIG. 1, the pixel driving circuit includes: a driving transistor DTFT, a capacitor Cst, a light emitting device 10, a reset module 20, a data writing module 30, a threshold compensation module 40, and a light emitting control module 50.

Operating phases of the pixel driving circuit may, for example, include a reset phase, a data writing phase and a light emitting phase.

Both terminals of the capacitor Cst are respectively connected to a gate electrode of the driving transistor DTFT and a first power terminal VDD. The reset module 20 is connected to a reset terminal Reset, an initialization voltage terminal Vinit and a first terminal of the light emitting device 10, and is configured to transmit a signal at the initialization voltage terminal Vinit to the first terminal of the light emitting device 10 in response to a control of a first level (e.g., a low level) signal provided by the reset terminal Reset in the reset phase, so as to initialize a potential at the first terminal of the light emitting device 10. The reset module 20 of the present disclosure may also transmit a signal at the initialization voltage terminal Vinit to the gate electrode of the driving transistor DTFT in the reset phase, thereby initializing the gate electrode of the driving transistor DTFT.

The data writing module 30 is connected to a data writing terminal Data and to the first electrode of the driving transistor DTFT at a first node Vs, and is configured to write a data signal at the data writing terminal Data into the first electrode of the driving transistor DTFT in the data writing phase.

Figure 2:
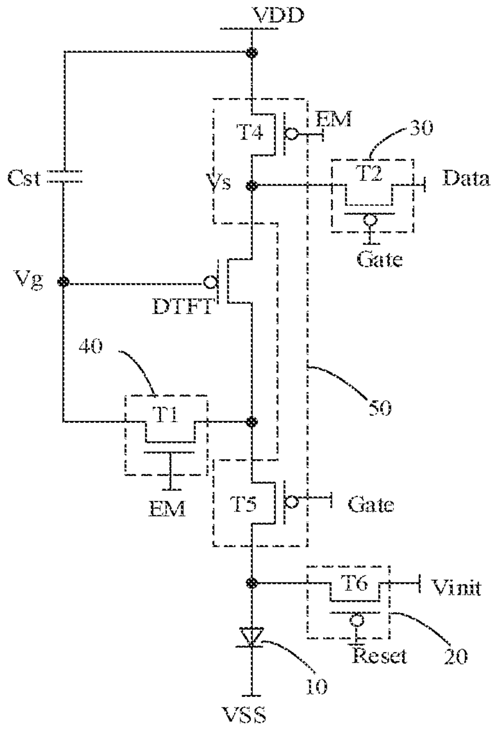
FIG. 2 shows a schematic diagram of a structure of a pixel driving circuit according to an embodiment of the present disclosure.

The threshold compensation module 40 includes a compensation transistor T1, a first electrode of the compensation transistor T1 is connected to a second electrode of the driving transistor DTFT, and a second electrode of the compensation transistor T1 is connected to the gate electrode of the driving transistor DTFT; the compensation transistor T1 is configured to electrically connect the second electrode and the gate of the driving transistor DTFT together in the data writing phase, as shown in FIG. 2.

The light emitting control module 50 is connected to the first power terminal VDD, the first electrode, the second electrode of the driving transistor DTFT, and the first terminal of the light emitting device 10, and includes a first gating transistor T5, and is configured to disconnect the first power terminal VDD from the first electrode of the driving transistor DTFT in the reset phase and the data writing phase; the first gating transistor T5 is configured to electrically connect the second electrode of the driving transistor DTFT and the light emitting device 10 together in the reset phase and electrically disconnect the second electrode of the driving transistor DTFT from the light emitting device 10 in the data writing phase; and the light emitting control module 50 is configured to electrically connect the first power terminal VDD and the first electrode of the driving transistor DTFT together and electrically connect the second electrode of the driving transistor DTFT and the light emitting device 10 together in the light emitting phase, as shown in FIG. 2.

The compensation transistor T1 is an oxide transistor (oxide TFT); the driving transistor DTFT is a low-temperature polysilicon transistor (LTPS), and the first gating transistor T5 is an oxide transistor. The oxide transistors in the present disclosure may all be N-type transistors, and the low-temperature polysilicon transistors may all be P-type transistors. However, the present disclosure is not limited thereto. For example, the oxide transistors may be all P-type transistors, and the low-temperature polysilicon transistors may be all N-type transistors. In the embodiments of the present disclosure, an active layer of the oxide transistor may be made of, for example, indium gallium zinc oxide (IGZO).

A second terminal of the light emitting device 10 is connected to a second power terminal VSS. The first power terminal VDD may be a high-level signal terminal, and the second power terminal VSS may be a low-level signal terminal, such as a ground terminal.

In the embodiment of the present disclosure, in the data writing phase, the compensation transistor T1 electrically connects the gate and second electrodes of the driving transistor DTFT, thereby forming a path through the second electrode of the driving transistor DTFT and compensating a voltage of the gate electrode of the driving transistor DTFT. Specifically, in the reset phase, the gate electrode of the driving transistor DTFT receives a signal from the initialization voltage terminal Vinit, thereby reaching the initialization voltage; in the data writing phase, data at the data writing terminal Data is written into the first electrode of the driving transistor DTFT, the gate electrode and the second electrode of the driving transistor DTFT are shortened, to form a diode structure, so that a data signal passes through the driving transistor DTFT and the compensation transistor T1 and flows to the gate electrode of the driving transistor DTFT, and a potential at the gate electrode of the driving transistor DTFT reaches Vdata+Vth, wherein Vth is a threshold voltage of the driving transistor DTFT, and Vdata is a voltage of the data signal provided by the data writing terminal Data. In the light emitting phase, under a voltage holding effect of the capacitor Cst, the potential at the gate electrode of the driving transistor DTFT is held at Vdata+Vth; a voltage at the first power terminal VDD passes through the light emitting control module 50 and the driving transistor DTFT and generates a driving current flowing into the light emitting device 10. At this time, the driving current IOLED satisfies the following saturation current formula:

$$I_{OLED} = K(Vgs - Vth)^2 = K(Vdata + Vth - ELVDD - Vth)^2 = K(Vdata - ELVDD)^2 \quad (1)$$

where K is a coefficient related to characteristics of the driving transistor DTFT, Vgs is a gate-source voltage of the driving transistor DTFT. i.e., a voltage between the gate electrode and the first electrode of the driving transistor DTFT, and ELVDD is a voltage supplied from the first power terminal VDD.

It may be seen that the driving current IOLED supplied to the light emitting device 10 is not affected by the threshold.

In addition, the low-temperature polysilicon transistor has the advantages of a large threshold voltage, a small starting voltage, a high mobility and the like, so that the driving transistor DTFT in the present disclosure may realize low-frequency and low-power consumption driving by adopting the low-temperature polysilicon transistor; compared with the low-temperature polysilicon transistor, the oxide transistor has a small and gentle (or relatively stable) current Ioff in an off state, so the compensation transistor T1 and the first gating transistor T5 each adopt the oxide transistor, the leakage current in the pixel driving circuit is very small, which may solve the problem that the light emitting brightness of the light emitting device 10 in the pixel driving circuit is inconsistent. In addition, in the pixel driving circuit of the present disclosure, the first gating transistor T5 is an oxide transistor and is a transistor of the same type as the compensation transistor T1. For example, the first gating transistor T5 and the compensation transistor T1 described in the embodiment of the present disclosure are both N-type oxide transistors, and in a driving method for the pixel driving circuit, as shown in FIG. 1, the data writing module 30 and the light emitting control module 50 may only use the same scan signal terminal Gate, so that the complexity of the LTPO pixel driving circuit is reduced, one output signal line of the gate driving circuit is saved, the wiring difficulty is reduced, a narrow frame may be achieved, and a high PPI is achieved.

FIG. 2 shows a schematic diagram of a pixel driving circuit provided by an embodiment of the present disclosure, where the pixel driving circuit is an implementation of the structure in FIG. 1.

As shown in FIG. 2, the data writing module 30 includes: a writing transistor T2. A gate electrode of the writing transistor T2 is connected to the scan signal terminal Gate, a first electrode of the writing transistor T2 is connected to the data writing terminal Data, and a second electrode of the writing transistor T2 is connected to the first electrode of the driving transistor DTFT. The writing transistor T2 may be, for example, a low-temperature polysilicon transistor.

The compensation module 40 includes: a compensation transistor T1. A gate electrode of the compensation transistor T1 is connected to the light emitting control terminal EM, a first electrode of the compensation transistor T1 is connected to the second electrode of the driving transistor DTFT, and a second electrode of the compensation transistor T1 is connected to the gate electrode of the driving transistor DTFT.

The reset module 20 includes: a reset transistor T6. A gate electrode of the reset transistor T6 is connected to the reset terminal Reset, a second electrode of the reset transistor T6 is connected to the initialization voltage terminal Vinit, and a first electrode of the reset transistor T6 is connected to the first terminal of the light emitting device 10.

The light emitting control module 50 includes: a first gating transistor T5 and a second gating transistor T4. A gate electrode of the first gating transistor T5 is connected to the scan signal terminal Gate, a gate electrode of the second gating transistor T4 is connected to the light emitting control terminal EM, a first electrode of the second gating transistor T4 is connected to the first power terminal VDD, a second electrode of the second gating transistor T4 is connected to the first electrode of the driving transistor DTFT, a first electrode of the first gating transistor T5 is connected to the second electrode of the driving transistor DTFT, and a second electrode of the first gating transistor T5 is connected to the first terminal of the light emitting device 10.

In the present embodiment, the transistors (i.e., the reset transistor T1 and the first gating transistor T5) directly connected to the gate and second electrodes of the driving transistor DTFT are oxide transistors, and the remaining transistors are low-temperature polysilicon transistors.

A first level signal provided by the reset terminal Reset in the reset phase is a signal for controlling the reset transistor T6 to be turned on, a first level signal provided by the scan signal terminal Gate in the data writing phase is a signal for controlling the writing transistor T2 to be turned on, a second level signal (for example, a high level signal) provided by the scan signal terminal Gate in the reset phase and the light emitting phase is a signal for controlling the first gating transistor T5 to be turned on, a second level signal provided by the light emitting control terminal EM in the reset phase and the data writing phase is a signal for controlling the compensation transistor T1 to be turned on, and the first level signal provided in the light emitting phase is a signal for controlling the second gating transistor T4 to be turned on. In the embodiment, the reset transistor T6 and the writing transistor T2 are both P-type transistors, that is, the first level signal is a low level signal, and the scan signal terminal Gate provides the low level signal in the data writing phase.

Figure 3:
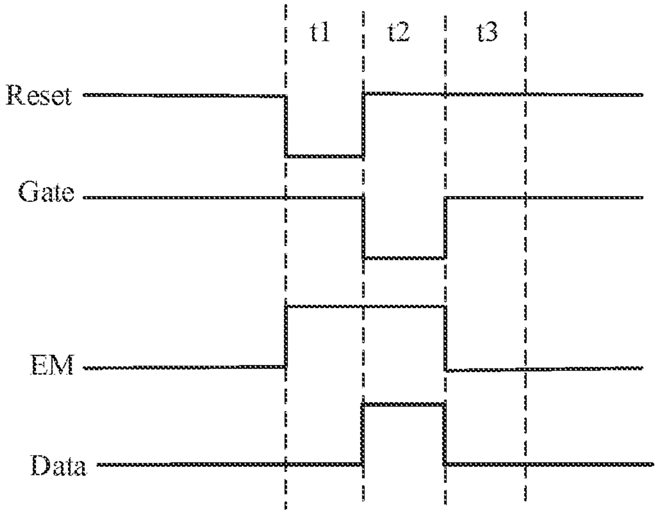
FIG. 3 shows a timing diagram of signals applied to respective signal terminals in the pixel driving circuit according to the embodiment of the present disclosure shown in FIG. 2.

FIG. 3 shows a timing chart of signals applied to respective signal terminals in the pixel driving circuit shown in FIG. 2, and in conjunction with FIGS. 2 and 3, the light emitting control terminal EM and the scan signal terminal Gate each provide a high level signal (i.e., a second level signal) and the reset terminal Reset provides a low level signal (i.e., a first level signal) in the reset phase t1.

At this time, the first gating transistor T5 and the compensation transistor T1 are turned on under the control of the high level signals of the light emitting control terminal EM and the scan signal terminal Gate, and the reset transistor T6 is turned on under the control of the low level signal of the reset terminal Reset, and the initialization signal at the initialization voltage terminal Vinit is transmitted to the gate electrode of the driving transistor DTFT through the reset transistor T6, the first gating transistor T5, and the compensation transistor T1, and to the first terminal of the light emitting device 10 through the reset transistor T6. In addition, since the light emitting control terminal EM provides a high level signal, the first gating transistor T4 is turned off, and a driving current is not generated; since the scan signal terminal Gate provides a high level signal, the writing transistor T2 is turned off, and no signal is written into the driving transistor DTFT.

In the data writing phase t2, the reset terminal Reset provides a high level signal, the light emitting control terminal EM provides a high level signal, and the scan signal terminal Gate provides a low level signal.

At this time, the reset transistor T6, the first gating transistor T5, and the second gating transistor T4 are all turned off. Since the scan signal terminal Gate supplies a low level signal and the light emitting control terminal EM supplies a high level signal, the writing transistor T2 and the compensation transistor T1 are turned on, so that a data signal at the data writing terminal Data is transmitted to the gate electrode of the driving transistor DTFT through the compensation transistor T1 and the writing transistor T2, and a potential at the gate electrode of the driving transistor DTFT reaches Vdata+Vth.

In the light emitting phase t3, the reset terminal Reset provides a high level signal, the scan signal terminal Gate provides a high level signal, and the light emitting control terminal EM provides a low level signal.

At this time, the reset transistor T6 remains being turned off, the writing transistor T2 is off, and the compensation transistor T1 is off.

The second gating transistor T4 is turned on under the control of the low level signal supplied from the light emitting control terminal EM, and the first gating transistor T5 is turned on under the control of the low level signal supplied from the scan signal terminal EM. Under the voltage holding action of the capacitor Cst, the potential at the gate electrode of the driving transistor DTFT is held at Vdata+Vth, the driving transistor DTFT remains being turned on, and a driving current flows into the light emitting device 10 to cause the light emitting device 10 to emit light, a magnitude of the driving current is referred to the above formula (1).

As described above, in the pixel driving circuit of the embodiment of the present disclosure, only three signal control terminals are provided: the reset terminal Reset, the scan signal terminal Gate, and the light emitting control terminal EM. The second gating transistor T4 and the compensation transistor T1 are controlled to be turned on and off by the light emitting control terminal EM, and the first gating transistor T5 and the writing transistor T2 are controlled to be turned on and off by the scan signal terminal Gate, so that fewer lines may be used in the layout for the pixel driving circuit, a display panel with a narrow frame is easily implemented, and a high PPI is easily implemented.

As described above, the pixel driving circuit of the present disclosure includes the oxide transistor and the low-temperature polysilicon transistor, for example, the first gating transistor T5 and the compensation transistor T1 may be oxide transistors; the reset transistor T6, the driving transistor DTFT, the second gating transistor T4, and the writing transistor T2 may be low-temperature polysilicon transistors; the compensation transistor T1 and the first gating transistor T5 may be N-type oxide transistors, and the driving transistor DTFT, the second gating transistor T4, the writing transistor T2 and the reset transistor T6 may all be P-type low-temperature polysilicon transistors. Based on this, in order to realize the operations of the respective phases as described above, the gate electrodes of the second gating transistor T4 and the compensation transistor T1 may be connected to the same light emitting control signal line em through the light emitting control terminal EM, and the gate electrodes of the writing transistor T2 and the first gating transistor T5 may be connected to the same first scan signal line gate through the scan signal terminal Gate, as shown in FIG. 7.

Figure 4:
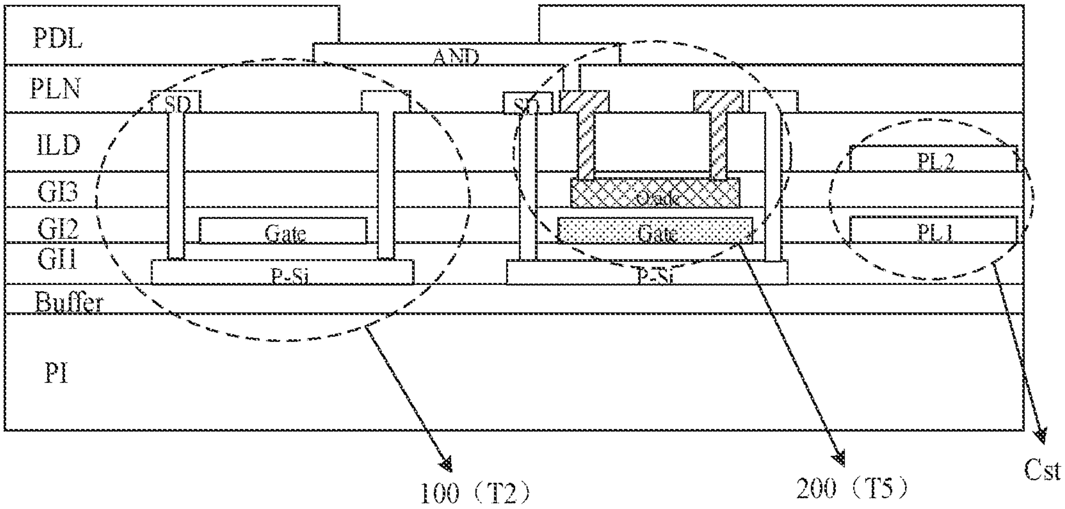
FIGS. 4 to 6 are schematic diagrams illustrating how to arrange transistors and capacitors on a substrate in the pixel driving circuit according to the embodiment of the present disclosure shown in FIG. 2.

FIG. 4 shows an example layout in which oxide transistors, low-temperature polysilicon transistors, and a capacitor Cst are arranged on the same substrate. For example, the first gating transistor T5, the second gating transistor T4, the writing transistor T2, the reset transistor T6, the compensation transistor T1, the driving transistor DTFT, and the capacitor Cst in the pixel driving circuit of the embodiment of the present disclosure may be disposed on the same substrate PI.

Figure 5:
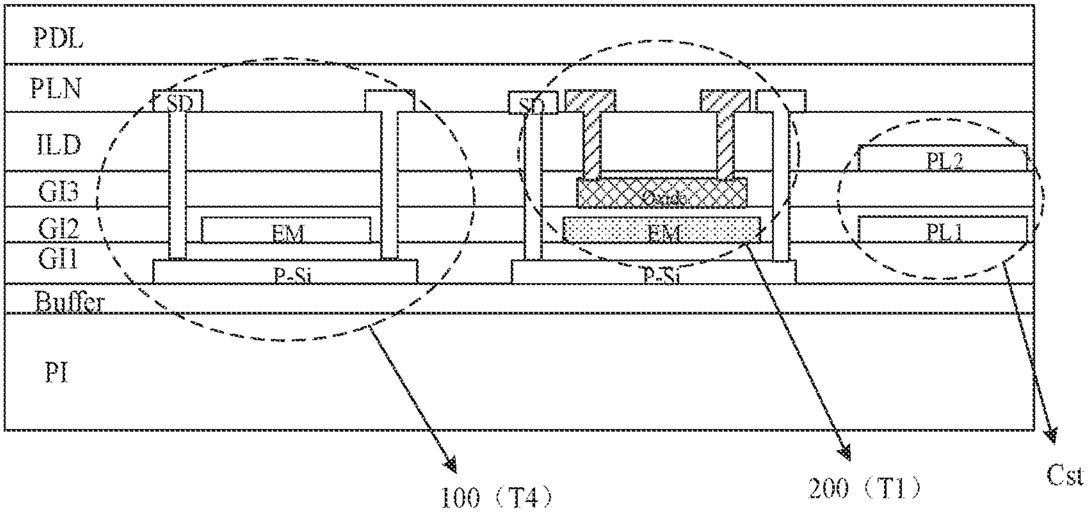
Figure 6:
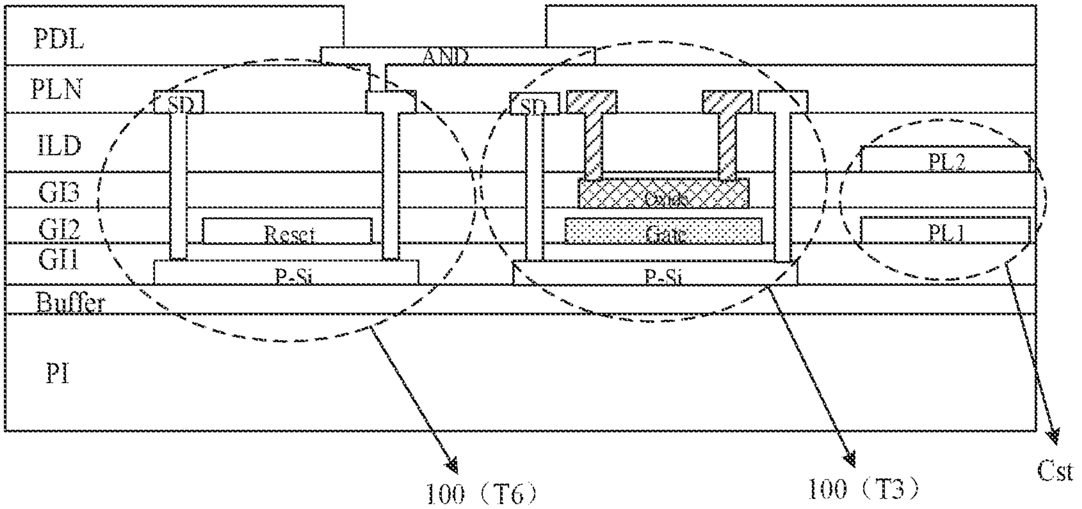

Specifically, as shown in FIGS. 4 to 6, a buffer layer Buffer, a first insulating layer GI1, a second insulating layer GI2, a third insulating layer GI3, an interlayer insulating layer ILD, a planarization layer PLN, and a pixel defining layer PDL are sequentially disposed on the substrate PI. In addition, the first electrode of the light emitting device (e.g., an anode AND of an organic light emitting diode) may be disposed in an opening formed in the pixel defining layer PDL. As shown in FIG. 2, in the pixel driving circuit of the present disclosure, only the first gating transistor T5 and the reset transistor T6 are connected to the first electrode AND, and the other transistors are not connected to the first electrode AND.

As shown in FIG. 4, a low-temperature polysilicon transistor 100 and an oxide transistor 200 are disposed on the substrate PI. The low-temperature polysilicon transistor 100 includes an active layer P-Si (polysilicon), a gate electrode (shown as a gate electrode Gate in FIGS. 4 and 6, and shown as a gate electrode EM in FIG. 5, depending on a driving signal line of a specific transistor), and source and drain electrodes SD; the oxide transistor 200 includes a gate electrode (shown as a gate electrode Gate in FIGS. 4 and 6, and shown as a gate electrode EM in FIG. 5, depending on a driving signal terminal of a specific transistor), an active layer Oxide (an oxide active layer, e.g., IGZO), and source and drain electrodes SD. In the present embodiment, as shown in FIG. 2, the transistors connected to the first electrode AND of the light emitting device are, for example, the first gating transistor T5 and the reset transistor T6. In the embodiment shown in FIG. 4, the low-temperature polysilicon transistor 100 and the oxide transistor 200 (T5) are only for showing the positional relationship between the layers of the oxide transistor 200 and the low-temperature polysilicon transistor 100, which does not represent a specific arrangement of the oxide transistor and the low-temperature polysilicon transistor in the pixel driving circuit of the embodiment of the present disclosure. For example, the example layout of the respective transistors in the pixel driving circuit of the embodiment of the present disclosure is shown in FIG. 7.

Specifically, in the embodiment of the present disclosure, for any one of the driving transistor DTFT, the reset transistor T6, the writing transistor T2, and the second gating transistor T4, each of which is the low-temperature polysilicon transistor, the active layer P-Si of the low-temperature polysilicon transistor is disposed between the substrate PI and the first insulating layer GI1, as shown in FIGS. 4 to 6, on a surface of the buffer layer Buffer, covered by the first insulating layer GI1; the gate electrode of the low-temperature polysilicon transistor is disposed above the active layer P-Si of the driving transistor DTFT and between the first insulating layer GI1 and the second insulating layer GI2, as shown in FIG. 4, disposed on the first insulating layer GI1, covered by the second insulating layer GI2; the source and drain electrodes SD of the low-temperature polysilicon transistor are disposed in a same layer between the interlayer dielectric layer ILD and the planarization layer PLN, as shown in FIGS. 4 to 6, disposed on the interlayer insulating layer ILD and covered by the planarization layer PLN, and the source and drain electrodes SD are connected to the active layer P-Si through vias in the interlayer dielectric layer ILD, the first insulating layer GI1, the second insulating layer GI2, and the third insulating layer GI3.

For the compensation transistor T1 or the first gating transistor T5, each of which is the oxide transistor, the gate electrode of the oxide transistor and the gate electrode of the driving transistor DTFT may be disposed in a same layer, both between the first insulating layer GI1 and the second insulating layer GI2, as shown in FIGS. 4 and 5, disposed on the first insulating layer GI1, covered by the second insulating layer GI2; the active layer Oxide of the oxide transistor is located between the second insulating layer GI2 and the third insulating layer GI3, as shown in FIGS. 4 and 5, and is disposed on the second insulating layer GI2 and covered by the third insulating layer GI3; the source and drain electrodes SD of the oxide transistor and the source and drain electrodes SD of the driving transistor DTFT are disposed in a same layer and are both located between the interlayer dielectric layer ILD and the planarization layer PLN, as shown in FIGS. 4 and 5, disposed on the interlayer insulating layer ILD and covered by the planarization layer PLN, and the source and drain electrodes SD are connected to the active layer Oxide through the vias in the interlayer dielectric layer ILD and the third insulating layer GI3.

In FIG. 4, the gate electrode Gate of the writing transistor T2 and the gate electrode Gate of the first gating transistor T5 are disposed in a same layer, for example, in the layout diagram of the components in the pixel driving circuit of the embodiment of the present disclosure as shown in FIG. 7, the gate electrode Gate of the writing transistor T2 and the gate electrode Gate of the first gating transistor T5 are disposed on the same first scan signal line gate; in FIG. 5, the gate electrode EM of the second gating transistor T4 and the gate electrode EM of the compensation transistor T1 are disposed in a same layer, for example, as shown in FIG. 7, the gate electrode EM of the second gating transistor T4 and the gate electrode EM of the compensation transistor T1 are disposed on the same light emitting signal line em. As shown in FIG. 6, the gate electrode Reset of the reset transistor T6 is disposed on the reset signal line Reset. Further, as shown in FIGS. 4 to 6, a first plate PL1 of the capacitor Cst is disposed in a same layer as the gate electrode Gate of the driving transistor DTFT, and a second plate PL2 of the capacitor Cst is connected to the first power terminal VDD and disposed in a same layer as a second scan signal line gate2 (not shown, the second scan signal line gate2 may be another scan signal line in the driving circuit, but the present disclosure is not limited thereto, and the second scan signal line gate2 may be any other metal layer, for example) of the pixel driving circuit DTFT, which is different from the first scan signal line gate, wherein the second plate PL2 is disposed directly above the first plate PL1, as shown in FIG. 7.

In addition, as shown in FIG. 7, one of the source and drain electrodes SD of the compensation transistor T1 may be connected to the first plate PL1 through a via V1 in the second plate PL2.

In the above embodiment of the present disclosure, as shown in FIGS. 4 to 6, an active layer of the driving transistor DTFT, an active layer of the writing transistor T2 and an active layer of the second gating transistor T4 are made of the low-temperature polysilicon P-Si; and an active layer of the compensation transistor T1 and an active layer of the first gating transistor T5 are made of the oxide material (e.g., IGZO), as shown in FIG. 7.

In addition, the present disclosure further provides a driving method of the pixel driving circuit, as shown in FIG. 8, including:

S1: in the reset phase, the first gating transistor and the compensation transistor are turned on, and the reset module transmits the signal at the initialization voltage terminal to the gate electrode of the driving transistor and the light emitting device through the first gating transistor and the compensation transistor so as to control the driving transistor to be turned on; the light emitting control module disconnects the first power terminal from the first electrode of the driving transistor;

S2: in the data writing phase, the data writing module writes a data signal at the data writing terminal into the first electrode of the driving transistor; the compensation transistor electrically connects the second electrode and the gate electrode of the driving transistor together; the light emitting control module disconnects the first power terminal from the first electrode of the driving transistor and disconnects the second electrode of the driving transistor from the light emitting device;

S3: in the light emitting phase, the light emitting control module electrically connects the first power terminal and the first electrode of the driving transistor together and electrically connects the second electrode of the driving transistor and the light emitting device together.

When the pixel driving circuit shown in FIG. 2 is used as the pixel driving circuit, the driving method specifically includes:

in the reset phase, providing a first level signal to the reset terminal and providing a second level signal to the scan signal terminal and the light emitting control terminal;

in the data writing phase, providing the second level signal to the reset terminal and the light emitting control terminal, and providing the first level signal to the scan signal terminal; and in the light emitting phase, providing the second level signal to the reset terminal and the scan signal terminal, and providing the first level signal to the light emitting control terminal.

The present disclosure further provides a display panel including the pixel driving circuit according to any of the above embodiments. Specifically, a display area of the display panel includes a plurality of pixel units each including a light emitting device such as an organic light emitting diode OLED therein, the plurality of pixel units are arranged in an array of rows and columns, and a pixel driving circuit is provided in each pixel unit.

Specifically, the display panel may be any product or component having a display function, such as an organic light emitting diode (OLED) display panel, an electronic paper, a mobile phone, a tablet computer, a television, a display, a notebook computer, a digital photo frame, and a navigator.

In the display panel of the present disclosure, since the oxide transistor is used as the first gating transistor of the light emitting control module in each pixel driving circuit, the data writing module 30 and the light emitting control module 50 may be controlled by only one scan signal line gate, and the threshold compensation module 40 and the light emitting control module 50 may be controlled by only one light emitting control line em, so that the complexity of the LTPO pixel driving circuit is reduced, the number of the output signal lines of the gate driving circuit is saved, the wiring difficulty is reduced, a narrow frame may be realized, and a high PPI may be realized.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A pixel driving circuit, comprising a driving transistor, a capacitor and a light emitting device, wherein both terminals of the capacitor are connected to a first power terminal and a gate electrode of the driving transistor, respectively, wherein the pixel driving circuit further comprises:

a reset module configured to transmit a signal at an initialization voltage terminal to the gate electrode of the driving transistor and a first terminal of the light emitting device in a reset phase, to initialize potentials at the gate electrode of the driving transistor and the first terminal of the light emitting device;

a data writing module configured to write a data signal at a data writing terminal into a first electrode of the driving transistor in a data writing phase;

a threshold compensation module comprising a compensation transistor, which is configured to electrically connect a second electrode and the gate electrode of the driving transistor together in the data writing phase; and a light emitting control module comprising a first gating transistor and configured to disconnect the first power terminal from the first electrode of the driving transistor in the reset phase and the data writing phase; wherein the first gating transistor is configured to electrically connect the second electrode of the driving transistor and the light emitting device in the reset phase and disconnect the second electrode of the driving transistor from the light emitting device in the data writing phase; the light emitting control module is configured to electrically connect the first power terminal and the first electrode of the driving transistor and electrically connect the second electrode of the driving transistor and the light emitting device in a light emitting phase; and wherein the compensation transistor is an oxide transistor, the driving transistor is a low-temperature polysilicon transistor, and the first gating transistor is an oxide transistor;

wherein a first electrode of the first gating transistor is connected to the second electrode of the driving transistor, and a second electrode of the first gating transistor is connected to the first terminal of the light emitting device;

the data writing module comprises a writing transistor; and a gate electrode of the first gating transistor and a gate electrode of the writing transistor are connected to a scan signal terminal, a first electrode of the writing transistor is connected to the data writing terminal, and a second electrode of the writing transistor is connected to the first electrode of the driving transistor.

2. The pixel driving circuit according to claim 1, wherein the light emitting control module further comprises a second gating transistor configured to disconnect the first power terminal from the first electrode of the driving transistor in the reset phase and the data writing phase, and electrically connect the first power terminal to the first electrode of the driving transistor in the light emitting phase.

3. The pixel driving circuit according to claim 2, wherein a gate electrode of the second gating transistor is connected to a light emitting control terminal, a first electrode of the second gating transistor is connected to the first power terminal, and a second electrode of the second gating transistor is connected to the first electrode of the driving transistor.

4. The pixel driving circuit according to claim 3, wherein a gate electrode of the compensation transistor is connected to the light emitting control terminal, a first electrode of the compensation transistor is connected to the second electrode of the driving transistor, and a second electrode of the compensation transistor is connected to the gate electrode of the driving transistor.

5. The pixel driving circuit according to claim 4, wherein the reset module comprises a reset transistor;

a gate electrode of the reset transistor is connected to a reset terminal, a first electrode of the reset transistor is connected to the first terminal of the light emitting device, and a second electrode of the reset transistor is connected to the initialization voltage terminal;

the second gating transistor, the writing transistor and the reset transistor are all low-temperature polysilicon transistors;

the compensation transistor and the first gating transistor are N-type transistors; and the driving transistor, the second gating transistor, the writing transistor and the reset transistor are all P-type transistors.

6. The pixel driving circuit according to claim 5, further comprising a substrate, wherein the first gating transistor, the second gating transistor, the writing transistor, the reset transistor, the compensation transistor, the driving transistor, and the capacitor are on the substrate.

7. The pixel driving circuit according to claim 6, further comprising a first insulating layer, a second insulating layer, a third insulating layer, an interlayer dielectric layer, a planarization layer, and a pixel defining layer sequentially on the substrate, wherein an active layer of the driving transistor is between the substrate and the first insulating layer; the gate electrode of the driving transistor is on the active layer of the driving transistor and between the first insulating layer and the second insulating layer; the first electrode and the second electrode of the driving transistor are in a same layer and between the interlayer dielectric layer and the planarization layer; and the gate electrode of the compensation transistor, the gate electrode of the first gating transistor and the gate electrode of the driving transistor are in a same layer and between the first insulating layer and the second insulating layer; an active layer of the compensation transistor and an active layer of the first gating transistor are in a same layer and between the second insulating layer and the third insulating layer; and the first electrode and the second electrode of the compensation transistor, the first electrode and the second electrode of the first gating transistor and the first electrode and the second electrode of the driving transistor are in a same layer and between the interlayer dielectric layer and the planarization layer.

8. The pixel driving circuit according to claim 7, wherein active layers of the second gating transistor, the writing transistor and the reset transistor are in a same layer as the active layer of the driving transistor and between the substrate and the first insulating layer;

the gate electrodes of the second gating transistor, the writing transistor and the reset transistor are in a same layer as the gate electrode of the driving transistor and between the first insulating layer and the second insulating layer; and the first electrodes and the second electrodes of the second gating transistor, the writing transistor and the reset transistor are in a same layer as the first electrode and the second electrode of the driving transistor and between the interlayer dielectric layer and the planarization layer.

9. The pixel driving circuit according to claim 8, wherein the gate electrode of the writing transistor and the gate electrode of the first gating transistor are on a same first scan signal line; and/or the gate electrode of the second gating transistor and the gate electrode of the compensation transistor are on a same light emitting signal line.

10. The pixel driving circuit according to claim 9, wherein the gate electrode of the reset transistor is on a reset signal line; and/or a first plate of the capacitor is in a same layer as the gate electrode of the driving transistor, and a second plate of the capacitor is connected to the first power terminal and in a same layer as a second scan signal line of the pixel driving circuit, which is different from the first scan signal line, wherein the second plate is directly above the first plate.

11. The pixel driving circuit according to claim 10, wherein the active layers of the driving transistor, the writing transistor, the second gating transistor and the reset transistor are made of low-temperature polysilicon; and the active layer of the compensation transistor and the active layer of the first gating transistor are made of an oxide material.

12. A driving method of the pixel driving circuit according to claim 11, the driving method comprises:

in the reset phase, providing a first level signal to the reset terminal and providing a second level signal to the scan signal terminal and the light emitting control terminal;

in the data writing phase, providing the second level signal to the reset terminal and the light emitting control terminal, and providing the first level signal to the scan signal terminal; and in the light emitting phase, providing the second level signal to the reset terminal and the scan signal terminal, and providing the first level signal to the light emitting control terminal.

13. The pixel driving circuit according to claim 8, wherein the active layers of the driving transistor, the writing transistor, the second gating transistor and the reset transistor are made of low-temperature polysilicon; and the active layer of the compensation transistor and the active layer of the first gating transistor are made of an oxide material.

14. The pixel driving circuit according to claim 9, wherein the active layers of the driving transistor, the writing transistor, the second gating transistor and the reset transistor are made of low-temperature polysilicon; and the active layer of the compensation transistor and the active layer of the first gating transistor are made of an oxide material.

15. A driving method of the pixel driving circuit according to claim 1, comprising:

in the reset phase, turning on the first gating transistor and the compensation transistor, and transmitting, by the reset module, the signal at the initialization voltage terminal to the gate electrode of the driving transistor and the light emitting device through the first gating transistor and the compensation transistor, to control the driving transistor to be turned on; disconnecting, by the light emitting control module, the first power terminal from the first electrode of the driving transistor;

in the data writing phase, writing, by the data writing module, the data signal at the data writing terminal into the first electrode of the driving transistor; electrically connecting, by the compensation transistor, the second electrode and the gate electrode of the driving transistor together; disconnecting, by the light emitting control module, the first power terminal from the first electrode of the driving transistor and disconnecting the second electrode of the driving transistor from the light emitting device; and in the light emitting phase, electrically connecting, by the light emitting control module, the first power terminal and the first electrode of the driving transistor together and electrically connecting the second electrode of the driving transistor and the light emitting device together.

16. A display panel, comprising the pixel driving circuit of claim 1.

17. The pixel driving circuit according to claim 16, wherein the reset module comprises a reset transistor;

a gate electrode of the reset transistor is connected to a reset terminal, a first electrode of the reset transistor is connected to the first terminal of the light emitting device, and a second electrode of the reset transistor is connected to the initialization voltage terminal;

the second gating transistor, the writing transistor and the reset transistor are all low-temperature polysilicon transistors;

the compensation transistor and the first gating transistor are N-type transistors; and the driving transistor, the second gating transistor, the writing transistor and the reset transistor are all P-type transistors.

18. The pixel driving circuit according to claim 17, further comprising a substrate, wherein the first gating transistor, the second gating transistor, the writing transistor, the reset transistor, the compensation transistor, the driving transistor, and the capacitor are on the substrate.

19. A pixel driving circuit, comprising a driving transistor, a capacitor and a light emitting device, wherein both terminals of the capacitor are connected to a first power terminal and a gate electrode of the driving transistor, respectively, wherein the pixel driving circuit further comprises:

a reset module configured to transmit a signal at an initialization voltage terminal to the gate electrode of the driving transistor and a first terminal of the light emitting device in a reset phase, to initialize potentials at the gate electrode of the driving transistor and the first terminal of the light emitting device;

a data writing module configured to write a data signal at a data writing terminal into a first electrode of the driving transistor in a data writing phase;

a threshold compensation module comprising a compensation transistor, which is configured to electrically connect a second electrode and the gate electrode of the driving transistor together in the data writing phase; and a light emitting control module comprising a first gating transistor and configured to disconnect the first power terminal from the first electrode of the driving transistor in the reset phase and the data writing phase; wherein the first gating transistor is configured to electrically connect the second electrode of the driving transistor and the light emitting device in the reset phase and disconnect the second electrode of the driving transistor from the light emitting device in the data writing phase; the light emitting control module is configured to electrically connect the first power terminal and the first electrode of the driving transistor and electrically connect the second electrode of the driving transistor and the light emitting device in a light emitting phase; and wherein the compensation transistor is an oxide transistor, the driving transistor is a low-temperature polysilicon transistor, and the first gating transistor is an oxide transistor;

the pixel driving circuit further comprises a substrate, and the first gating transistor, the compensation transistor and the driving transistor are on the substrate; and the pixel driving circuit further comprises a first insulating layer, a second insulating layer, a third insulating layer, an interlayer dielectric layer, a planarization layer, and a pixel defining layer sequentially on the substrate, wherein an active layer of the driving transistor is between the substrate and the first insulating layer; the gate electrode of the driving transistor is on the active layer of the driving transistor and between the first insulating layer and the second insulating layer; the first electrode and the second electrode of the driving transistor are in a same layer and between the interlayer dielectric layer and the planarization layer; and the gate electrode of the compensation transistor, the gate electrode of the first gating transistor and the gate electrode of the driving transistor are in a same layer and between the first insulating layer and the second insulating layer; an active layer of the compensation transistor and an active layer of the first gating transistor are in a same layer and between the second insulating layer and the third insulating layer; and the first electrode and the second electrode of the compensation transistor, the first electrode and the second electrode of the first gating transistor and the first electrode and the second electrode of the driving transistor are in a same layer and between the interlayer dielectric layer and the planarization layer.

20. The pixel driving circuit according to claim 19, wherein the light emitting control module further comprises a second gating transistor configured to disconnect the first power terminal from the first electrode of the driving transistor in the reset phase and the data writing phase, and electrically connect the first power terminal to the first electrode of the driving transistor in the light emitting phase;

wherein a gate electrode of the second gating transistor is connected to a light emitting control terminal, a gate electrode of the first gating transistor is connected to a scan signal terminal, a first electrode of the second gating transistor is connected to the first power terminal, and a second electrode of the second gating transistor is connected to the first electrode of the driving transistor; and a first electrode of the first gating transistor is connected to the second electrode of the driving transistor, and a second electrode of the first gating transistor is connected to the first terminal of the light emitting device;

wherein a gate electrode of the compensation transistor is connected to the light emitting control terminal, a first electrode of the compensation transistor is connected to the second electrode of the driving transistor, and a second electrode of the compensation transistor is connected to the gate electrode of the driving transistor;

the data writing module comprises a writing transistor, and a gate electrode of the writing transistor is connected to the scan signal terminal, a first electrode of the writing transistor is connected to the data writing terminal, and a second electrode of the writing transistor is connected to the first electrode of the driving transistor;

wherein the reset module comprises a reset transistor;

a gate electrode of the reset transistor is connected to a reset terminal, a first electrode of the reset transistor is connected to the first terminal of the light emitting device, and a second electrode of the reset transistor is connected to the initialization voltage terminal;

the second gating transistor, the writing transistor and the reset transistor are all low-temperature polysilicon transistors;

the compensation transistor and the first gating transistor are N-type transistors; and the driving transistor, the second gating transistor, the writing transistor and the reset transistor are all P-type transistors; and the second gating transistor, the writing transistor, the reset transistor, and the capacitor are on the substrate.

* * * * *